Feb. 15, 1949.  I. V. ZECK  2,462,034
SPRAYING SYSTEM
Filed Aug. 17, 1945  2 Sheets-Sheet 1

Ivan V. Zeck
INVENTOR.

BY
HIS ATTORNEY

Feb. 15, 1949.　　　I. V. ZECK　　　2,462,034
SPRAYING SYSTEM
Filed Aug. 17, 1945　　　2 Sheets-Sheet 2

Ivan V. Zeck
INVENTOR.
BY
HIS ATTORNEY.

Patented Feb. 15, 1949

2,462,034

UNITED STATES PATENT OFFICE 2,462,034

SPRAYING SYSTEM

Ivan Vance Zeck, Iowa Park, Tex., assignor to Lee Lavere Thompson, Iowa Park, Tex.

Application August 17, 1945, Serial No. 610,971

8 Claims. (Cl. 259—95)

1

This application is a continuation-in-part, of my abandoned application, Serial No. 507,991, filed October 28, 1943.

This invention relates to an improvement in spraying systems, particularly of the character used for spraying an insecticide on growing plants.

In using an insecticide, it is necessary to mix the insecticide powder constituting a poison in water to form a solution, and to keep it well mixed continuously during application of the solution to the plants under treatment. Where the spraying action involves large fields, this may require a considerable period of time to cover the entire area, during which the powder may settle out of the water if there is no adequate means of maintaining the powder in solution.

The object of this invention is to improve the construction of the spraying system to provide for the maintenance of solution throughout the period when the insecticide is being applied to the plants.

A further object of the invention is to simplify and improve the construction of the spraying system so that it is not complex and expensive to manufacture, may be mounted and operated conveniently on a tractor from the power plant thereof and without the necessity for enlarged and complex structure.

I have provided a tank adapted to be mounted on the vehicle to contain the insecticide in solution. Provision is made in the tank for withdrawing the solution therefrom and directing the same to sprays under pressure, and also for keeping the insecticide in solution by creating surges in or agitation of the liquid in the tank. This is accomplished by the pumping of the solution from the tank and returning a portion thereof to jets in the tank under sufficient pressure to cause a circulation of the liquid in the bottom portion of the tank. Provision is made also for cleaning out the jet structure in the event of settling of the powder after a period of inactivity.

A preferred embodiment of the invention is shown in the accompanying drawings, in which.

2

Figure 1:
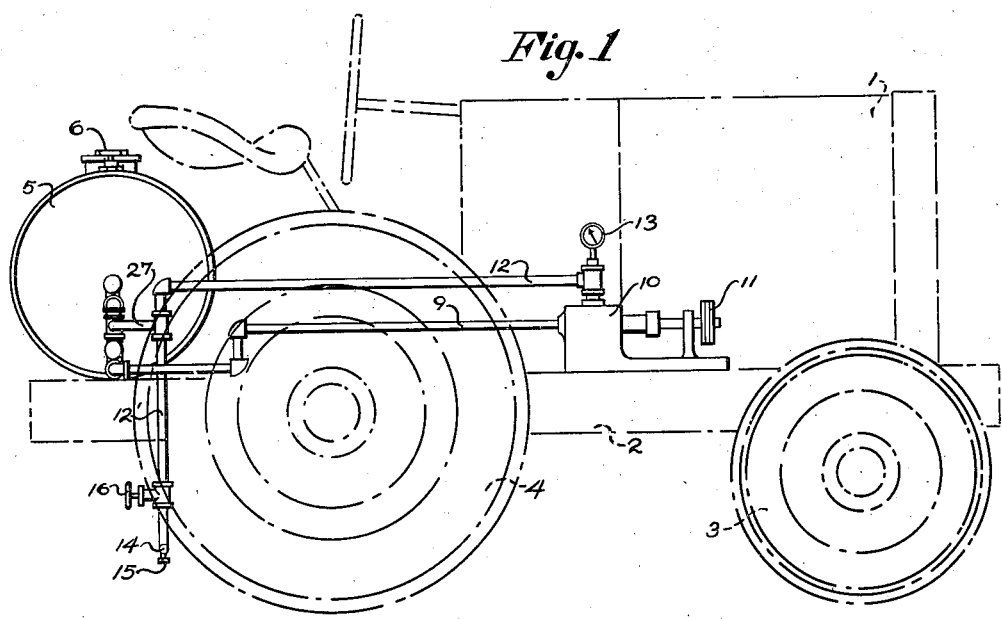
Fig. 1 is a partial diagrammatic view in side elevation showing the application of the spraying system to a tractor.

The invention is shown as mounted on a tractor designated generally by the numeral 1 and which includes the usual power plant supported by a frame 2 on front and rear wheels 3 and 4.

The spraying system includes a tank 5 preferably mounted on the chassis frame 2, such as at the rear end thereof, and which tank is adapted to contain the desired quantity of liquid. A filling opening in the top of the tank is provided with a closure 6. The tank may be provided also with the usual fittings such as a pressure gauge 7 and escape valve 8.

Extending from the tank 5 is a suction line 9, shown as connected with an end of the tank near the bottom thereof. The suction pipe 9 extends to a pump 10, shown as mounted on the frame 2 of the tractor and adapted to be driven by means of a pulley 11 from the power plant of the tractor. The discharge side of the pump 10 is connected with a pipe 12 provided with a pressure gauge 13 which pipe is extended at 12' and connected with a spray head 14 having spray nozzles 15 thereon. A control valve 16 is provided in the pipe 12', so as to regulate the quantity of liquid directed to the spray nozzles. The spraying head 14 is shown as extending transversely under the chassis frame 2, although its position will depend upon the size and type of plants to which the insecticide is to be applied, and where large plants are being treated, the spraying head should be raised to a higher position so as to be mounted out of contact with the plants. This may be accomplished more readily by forming the pipe 12' of a flexible hose and mounting the head 14 at the desired elevation on the tractor frame.

Figure 3:
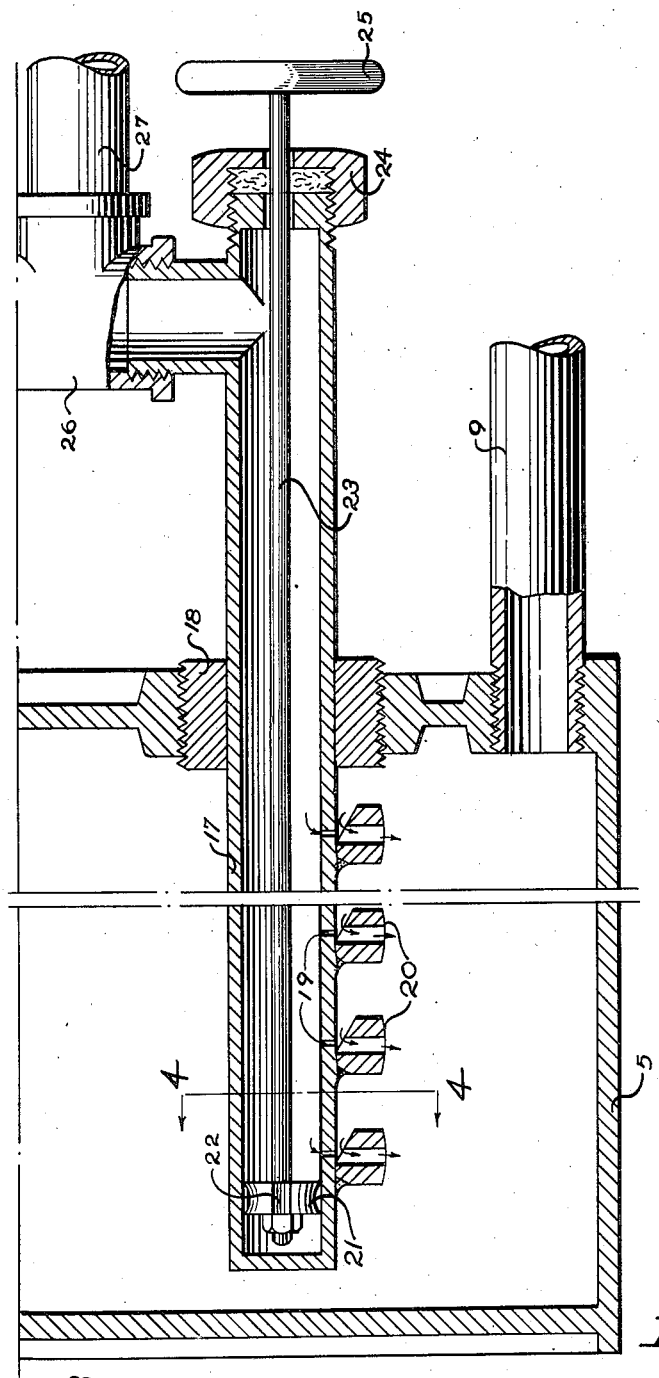
Fig. 3 is an enlarged longitudinal section through a portion of the tank and the mixer tube.
Figure 4:
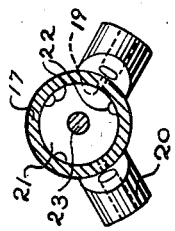
Fig. 4 is a cross section through said tube on the line 4—4 of Fig. 3.

Extending longitudinally of the tank 5 near the bottom thereof is a mixer tube 17 mounted in a fitting 18 in one head end of the tank. The mixer tube 17 has lateral perforations 19, shown in detail in Figs. 3 and 4, and are directed laterally into tubular sleeves 20 which form mixing jets. The tubular jets 20 are secured on the outside of the tube 17 as by welding thereto, so arranged as to direct the discharges from the orifices 19 through the tubular jets and laterally of the tank, in different directions and having beveled ends forming openings toward the tube 17, and therefore act as Venturi tubes or jets to create a turbulence or circulatory agitation in the bottom portion of the tank as liquid is forced under pressure from the mixer tube 17, through the orifices 19 and the tubular jets 20. By reason of the beveled end on the tubular jet, the solution in the bottom of the tank is recirculated by the suction created therein by the stream of liquid passing from the hole 19 to the tubular jet 20.

Since the insecticide powder will settle to the bottom of the liquid when the spraying system is not in use, provision is made for cleaning out the orifices 19 and any accumulation of powder that may settle in the tube 17. This is accomplished by a piston 21 mounted in the tube 17 and preferably having circumferential notches therein at 22. The piston 21 is mounted on a rod 23 extending through a stuffing box 24 at the outer end of the tube 17 and provided with a handle 25.

The mixer tube 17 is connected at one side with a T 26, which in turn is connected through a pipe 27 with the pipe 12, whereby fluid from the pipe 12 will be by-passed to the mixer tube 17.

Also mounted in the tank 5 is an auxiliary mixer tube 28 having lateral perforations or jets 29 therein. The tube 28 is spaced above the tube 17 and mounted in a fitting 30 in the end wall of a tank. The outer end of the tube 28 is connected with the T 26 to receive a portion of the by-passed fluid therefrom. An automatic relief valve 31 is connected with the tube 28 to regulate the portion of fluid admitted thereto.

When a pressure is developed by the pump 10 which is in excess of the volume which the sprays 15 and jets 20 will handle, the relief valve 31 will open and direct a portion of the fluid through pipe 28 and out through the orifices 29 to cause an auxiliary mixing action of the fluid within the tank, whereby a substantially uniform constant pressure is maintained on the pipe 12' and spray nozzles 15.

Figure 2:
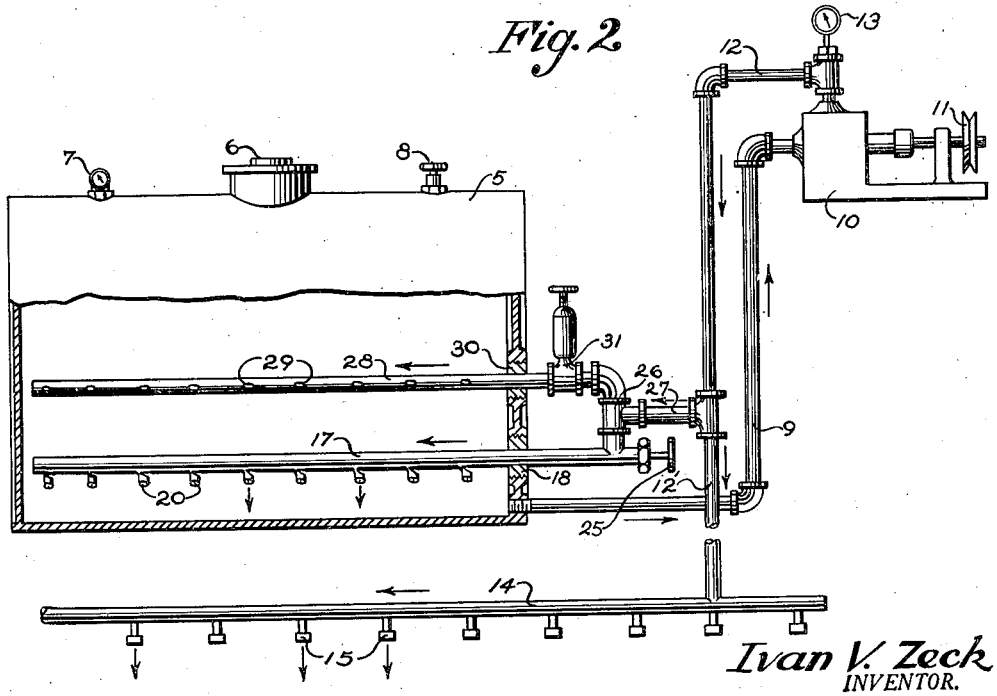
Fig. 2 is a further diagrammatic view of the spraying system with parts in section.

The operation of the spraying system will be evident from Fig. 2 where the flow of the liquid is indicated by the arrows. The tank 5 should be filled to the desired extent with the insecticide solution. Usually this is water into which the required amount of powder is mixed, after which the closure cap 6 is replaced.

The solution is withdrawn from the tank 5 upon the operation of the pump 10 through the suction pipe 9, and is forced under pressure through the pipes 12 and 12' to the spraying head 14 where it is discharged from the nozzles 15. The quantity of fluid forced through the pipe 12' may be regulated by the valve 16, so as to return or by-pass a portion of the pumped fluid through the pipe 27 and T 26 to the mixer tubes 17 and 28.

The tank may be filled to any desired level and with the automatic relief control valve 31 set at a desired pressure, and with the control valves 16 regulated to give the desired volume to the spray nozzles 15, the liquid pumped in excess of the amount discharged by spray nozzles 15 either will be by-passed through the lateral openings 19 and through Venturi jets 20 or, if the pressure builds up in excess of the set pressure of the automatic relief control valve 31, a portion of the liquid will be discharged into the pipe 28 and out through orifices 29 to create an auxiliary mixing action in the tank 5.

The by-pass fluid will be directed laterally at the jets 20, 29, where it will create a turbulence or circulatory agitation in the liquid in the tank, circulating it sufficiently under agitation to cause and maintain a thorough mixing of the insecticide powder with the water. This action continues throughout the period when the spray solution is being discharged at the jets 15 on the plants, so that a thorough mixing of the solution will be maintained during the spraying operation.

After the spraying system has remained static for a period of time and it is desired to start the operation, the accumulated powder should be removed from the mixer tube 17. This may be done by reciprocating the piston 21 back and forth lengthwise of the tube, thus loosening up any powder that may have caked on the walls of the tube and forcing it out through the orifices 19. Then upon the operation of the spraying system, this powder will be mixed thoroughly with the water in solution.

I claim:

1. In an insecticide spraying system, the combination of a mixing receptacle adapted to contain a spray solution, a pump, pipe connections between the pump and the receptacle to withdraw the solution from the receptacle and to direct said withdrawn solution under pressure from said pump, and horizontally arranged mixer tubes mounted in the receptacle at different elevations therein and connected with the pipe connection from the pump for directing the solution back into the receptacle to agitate the solution therein, mixing Venturi jets carried by the mixer tubes and in positions to receive the solution therefrom, and a valve for controlling the flow of the solution to at least one of the mixer tubes.

2. In an insecticide spraying system, the combination of a receptacle adapted to contain a spray solution, elongated mixer tubes mounted in the receptacle at respectively different elevations therein and elongated lengthwise of the receptacle, each of said tubes having discharge mixing Venturi jets spaced along the length thereof, said tubes being adapted to receive a liquid and to discharge said liquid at the jets for agitating the spray solution at respectively different elevations.

3. In a receptacle adapted to contain an insecticide spray solution, an elongated mixer tube having longitudinally spaced orifices in the side thereof for discharge of the solution therefrom, and jet members fixed to the tube externally thereof and projecting radially therefrom, each of said jet members having an end portion in registry with one of the orifices and having a lateral opening for receiving fluid therethrough from within the tank and re-circulating said fluid through the jet member by the action of the fluid discharged through the orifice and jet member creating a turbulent action in the tank.

4. In a receptacle adapted to contain a spray solution, a mixer tube having orifices in a side thereof for discharge of the solution therefrom, and a jet member fixed to the tube externally thereof over each orifice, said member being elongated radially of the tube and constructed for jet action therethrough from the orifice, said member having a beveled end adjacent the tube with a portion thereof spaced from the side of the tube to admit the solution in the tank in injector relation with the spray solution discharged through the orifice and jet member for creating a surging action in the tank.

5. In a receptacle adapted to contain a spray solution, an elongated mixer tube having longitudinally spaced orifices in the side thereof for discharge of the solution therefrom, and jet members fixed to the tube externally thereof, each of said jet members projecting radially from the tube and each having a beveled end portion overlapping one of said orifices in close proximity thereto and at an acute angle thereto in position to receive the discharge therefrom and to direct said discharge laterally of the tank creating a surging action in the tank.

6. A mixer pipe for an insecticide spray solution comprising an elongated tube having spaced orifices in the side thereof, and jet members fixed to the outside of the tube, each of said jet members projecting radially from the tube and having an open end adjacent the open side of the orifice in position to receive the discharge therefrom and to direct said discharge laterally therefrom, said jet member having a lateral opening adjacent the orifice.

7. A mixer pipe for an insecticide spray solution comprising a tube having an orifice in a side thereof, and a jet member having a beveled end fixed at one side to the tube on one side of the orifice and having the opposite side of said end spaced from the periphery of the tube for admitting fluid through said space in injector relation with the solution discharged through the orifice and jet member.

8. In a receptacle adapted to contain an insecticide spray solution, an elongated mixer tube mounted in the receptacle and having longitudinally spaced discharge orifices in the side thereof, a piston mounted in the tube and comprising a substantially closed body having a concave peripheral groove with lateral feather edges thereon forming scraping edges in the tube, said piston having a plurality of circumferential notches in the periphery thereof transversely of said edges, and a piston rod connected with the piston for reciprocating said piston in the tube.

IVAN VANCE ZECK.

REFERENCES CITED

The following references are of record in the file of this patent:

UNITED STATES PATENTS

| Number | Name | Date |
| --- | --- | --- |
| 519,978 | Thies | May 15, 1894 |
| 592,000 | Curtis | Oct. 19, 1897 |
| 782,680 | Millspaugh | Feb. 14, 1905 |
| 803,090 | Bradford | Oct. 31, 1905 |
| 1,180,807 | Vedder | Apr. 25, 1916 |
| 1,229,644 | Nesmith | June 12, 1917 |
| 1,580,476 | Fassio | Apr. 13, 1926 |
| 1,587,583 | Garland | June 8, 1926 |
| 1,972,001 | Witham et al. | Aug. 28, 1934 |
| 2,013,370 | Tygard | Sept. 3, 1935 |
| 2,022,481 | Shellenger | Nov. 26, 1935 |
| 2,350,715 | Berg et al. | June 6, 1944 |